United States Patent [19]

Dreibelbis

[11] 4,249,695
[45] Feb. 10, 1981

[54] THERMALLY ACTUATED MODULATING VALVE, AND ASSEMBLIES AND SYSTEMS UTILIZING THE SAME FOR PROVIDING TEMPERATURE CONTROLLED HEATED WATER

[75] Inventor: Richard C. Dreibelbis, Fair Lawn, N.J.

[73] Assignee: Emerson Electric Co. (H & H Prod. Div), Cedar Grove, N.J.

[21] Appl. No.: 102,772

[22] Filed: Dec. 12, 1979

[51] Int. Cl.³ ............................................. G05D 23/13
[52] U.S. Cl. ...................................236/12.2; 137/337; 237/8 C
[58] Field of Search ............... 236/12.18, 12.19, 12.20, 236/12.16, 12.21; 237/8 C; 126/374; 137/337

[56] References Cited

U.S. PATENT DOCUMENTS

| | | | |
|---|---|---|---|
| 3,202,321 | 8/1965 | Homeyer | 219/312 X |
| 3,388,861 | 6/1968 | Harding | 236/12.2 X |
| 3,642,176 | 2/1972 | Dreibelbis et al. | 219/312 X |
| 3,765,604 | 10/1973 | Trubert et al. | 236/12.2 |
| 3,792,812 | 2/1974 | Knapp | 236/12.2 |
| 3,827,016 | 7/1974 | Knapp | 236/12.2 |
| 3,836,050 | 9/1974 | Dreibelbis | 222/66 |
| 3,891,124 | 6/1975 | Dreibelbis | 222/66 |
| 3,905,518 | 9/1975 | Dreibelbis et al. | 222/146 HE |
| 3,955,759 | 5/1976 | Knapp | 236/12.2 |

*Primary Examiner*—William E. Tapolcai, Jr.
*Attorney, Agent, or Firm*—Daniel H. Bobis

[57] ABSTRACT

A thermally actuated modulating valve preferably for fail safe energy conservation systems includes a valve body having, a main inlet for cold source water, an outlet for heated water, and a fluid transfer chamber connected for delivering heated water to the outlet. A proportioning slide valve assembly formed in said valve body connected to the main inlet to receive cold water therefrom includes, spaced outlets, a slide valve to vary the volume of cold water delivered respectively through the spaced outlets, one of said spaced outlets for delivering varying volumes of cold water to be heated. The valve body has a mixing chamber connected to one of the spaced outlets of the proportioning slide valve assembly to receive cold water therefrom, an inlet for the heated water from the other of said spaced outlets, an outlet for delivering the mixture of cold and heated water to the fluid transfer chamber. A thermally actuated power element mounted in the transfer chamber moves responsive to variations in the temperature of the mixture of cold and heated water passing through said transfer chamber, said thermally actuated power element operatively connected to said slide valve for moving the same in accordance with such variations in the temperature of the water mixture passing through said transfer chamber, a calibrating and setting assembly for setting the temperature of the water mixture to be delivered from the outlet for said valve body, and a member in the outlet passage between the mixing chamber and the transfer chamber for generating a negative pressure to provide aspiration of fluid into the water delivered from the mixing chamber to the transfer chamber.

37 Claims, 29 Drawing Figures

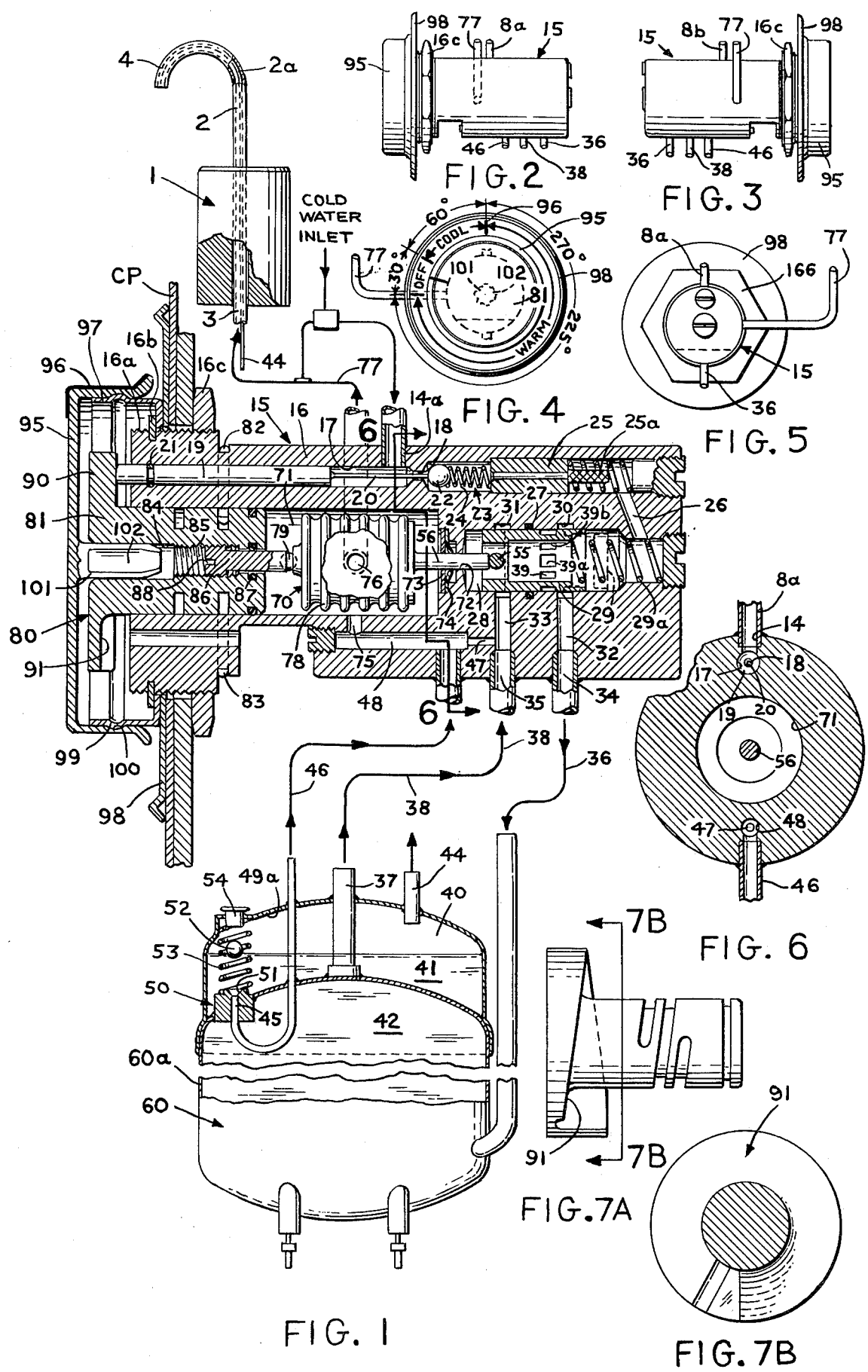

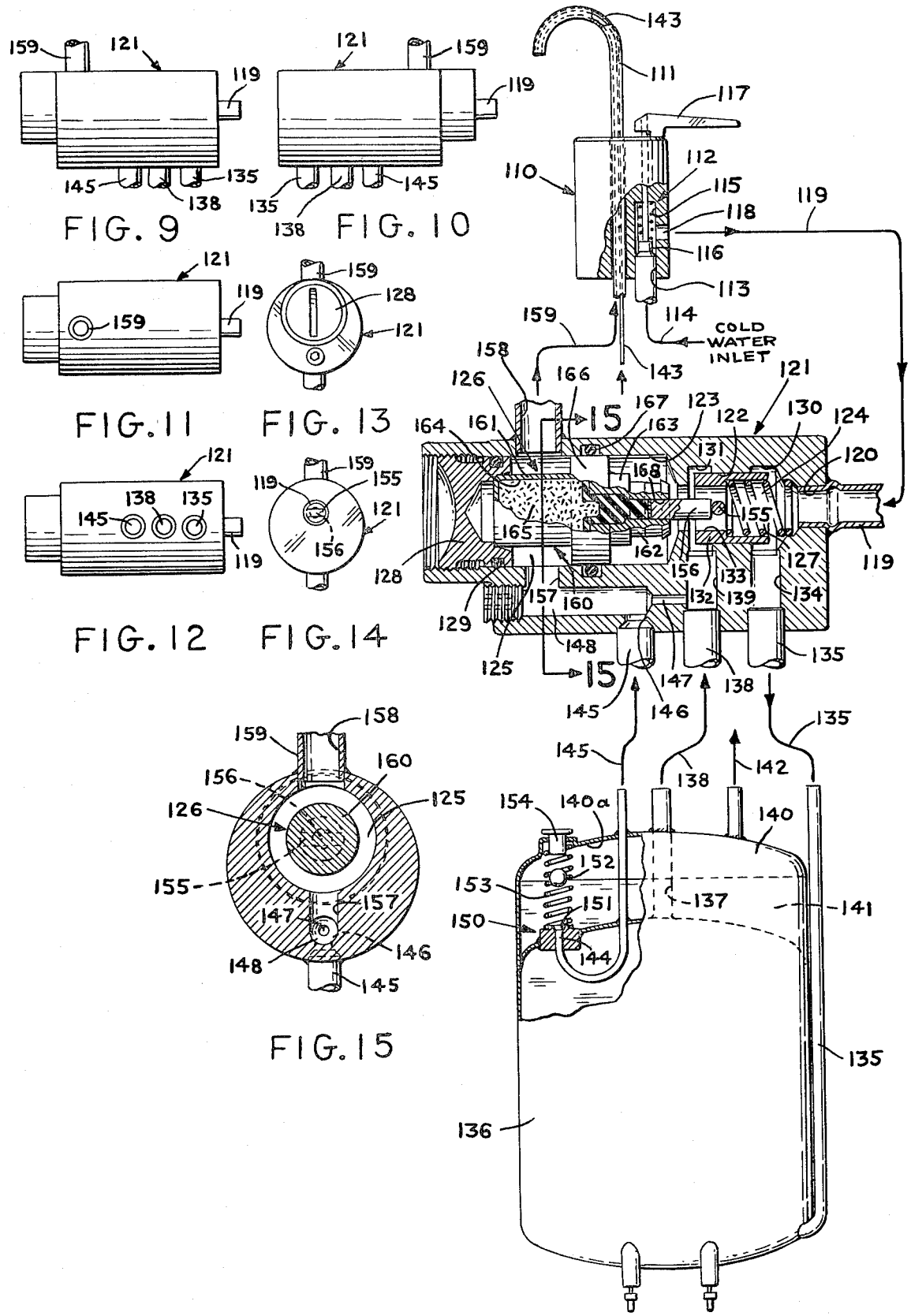

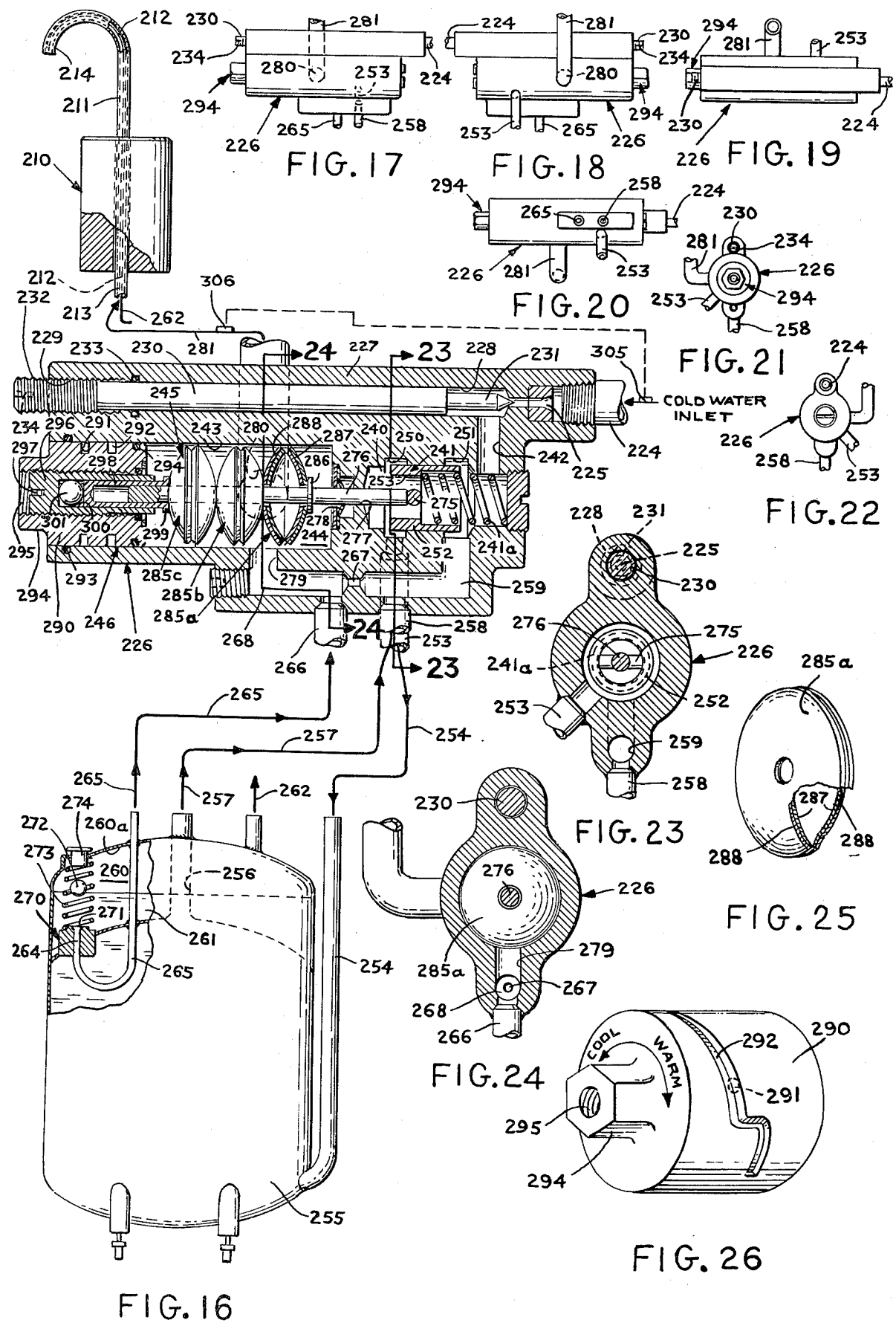

THERMALLY ACTUATED MODULATING VALVE, AND ASSEMBLIES AND SYSTEMS UTILIZING THE SAME FOR PROVIDING TEMPERATURE CONTROLLED HEATED WATER

BACKGROUND OF THE INVENTION

This invention relates generally to energy conservation systems for reducing the use of heated water and more particularly to water dispensing systems for reducing and optimizing the use of heated water therein by means of a thermally actuated proportioning, mixing, and aspirating valve assembly which is operatively associated with the heating reservoir for the water dispensing system and includes, a vent line cut off to prevent aspirating of air into the heated water delivered by the dispensing system.

In the conservation of natural resources and energy; systems are being developed in which the use of heated water is being reduced and optimized to comply with voluntary codes being established by the building industry for shower bathing facilities, public lavatory and washing facilities, and for industrial, residential and commercial buildings which require systems for conserving the use of heated water.

The present invention provides an improved thermally actuated modulating valve which is particularly operative with an atmospheric hot water service to provide an assembly or a dispensing system adapted to deliver a relatively large volume of mixed cold and extremely hot water at a controlled somewhat tepid temperature, the hot water being supplied from the relatively small hot water heating or storage tank in the atmospheric hot water service.

This assembly or system allows the heating and storage tank of the atmospheric hot water service to be disposed relatively close to the outlet or discharge point for the assembly or system thereby increasing the efficiency of the system by reducing ambient heat losses.

SUMMARY OF THE INVENTION

Thus the present invention covers a thermally actuated modulating valve having, a valve body with a main inlet for cold source water, an outlet for heated water and a transfer chamber connected to the outlet for delivering the temperature controlled mixture of cold and heated water, a proportioning assembly in the modulating valve has, a proportioning chamber with an inlet in communication with the main inlet, spaced outlets and a sized slide valve to vary the volume of cold water delivered from one or the other of the spaced outlets, at least one of the spaced outlets providing varying volumes of cold water to be heated, said modulating valve having a mixing chamber for mixing the cold water and heated water delivered thereto from the spaced outlets of the proportioning assembly, conduit means connecting the mixing chamber to the transfer chamber for delivering the total mixture of cold and heated water thereto, a thermal power actuator mounted in the transfer chamber of the modulating valve responsive to variations in the temperature of the mixtue of cold and heated water passing through said transfer chamber, coupling means connecting said thermal power actuator to said slide valve for movement thereof in accordance with the variations in temperature, and calibrating and setting means for regulating and controlling the temperature of the water mixture passing through said transfer chamber.

The thermally actuated modulating valve as above described including, means between the mixing chamber and the transfer chamber for generating a negative pressure for aspirating water or other fluid into the mixture of cold and hot water being delivered through the outlet of the modulating valve.

The thermally actuated modulating valve as above described wherein the slide valve has openings therein for operative association with the said spaced outlet for providing varying volumes of cold water to be heated so disposed that on failure of the thermal power actuator the thermally actuated modulating valve will cause the slide valve to move so as to close or prevent delivery of cold water to the spaced outlet.

In combination, the thermally actuated modulating valve as above described for a dispensing system having, an atmospheric hot water service including, a heating and storage tank means connecting one of said spaced supply outlets in the proportioning assembly to the heating and storage tank for displacing varying volumes of hot water therefrom, and a return conduit connected between said heating and storage tank and said modulating valve for passing said hot water to the mixing chamber.

In the combination as above set forth wherein the heating and storage tank includes, an expansion chamber, for collecting expansion water from the heating and storage tank and drain back water from the dispensing system, and said thermally actuated modulating valve as above described includes, means in the modulating valve for generating a negative pressure, and said means connected to the expansion chamber of the heating and storage tank for aspirating the collected water therein, and means for mixing said aspirated water with the mixture of cold and hot water to be delivered from the outlet of the modulating valve.

In the combination as above described including means whereby the system will fail safe so as to prevent discharge of fluid at unduly high temperatures.

Accordingly, it is an object of the present invention to provide a thermally actuated modulating valve assembly adapted to deliver heated water at a predetermined or controlled temperature which is responsive to variations in the temperature of the heated water flowing therethrough so that it reduces and optimizes the quantities of heated water required and used for delivering the heated water at the predetermined or controlled temperature.

It is another object of the present invention to provide a thermally actuated modulating valve which includes an assembly for proportioning cold source water so that at least one portion thereof can be passed from the modulating valve to be heated and returned to the modulating valve for mixing with the other portion of the cold source water.

It is another object of the present invention to provide a thermally actuated modulating valve which includes a assembly for proportioning cold source water so that at least one portion thereof can be heated, for mixing the cold and heated portions of said source water, and for passing the same in heat exchange relation with a thermal power actuator which is connected to move the proportioning assembly responsive to variations in the temperature of the mixed cold and hot water, so as to maintain the mixture at a predetermined or controlled temperature.

It is another object of the present invention to provide a thermally actuated modulating valve which includes, a calibrating and setting assembly to regulate and operative to control the temperature of the mixture of cold and hot water delivered through the outlet of the thermally actuated modulating valve.

It is another object of the present invention to provide in combination for a heated water dispensing system a thermally actuated modulating valve and an atmospheric pressure hot water service which delivers larger volumes of water at a predetermined or controlled temperature from a relatively small volume of heated and stored very hot water in the atmospheric hot water service.

It is another object of the present invention to provide in combination for a dispensing system a thermally actuated modulating valve and an atmospheric pressure hot water service in operative association wherein the atmospheric hot water service includes a heating and storage tank having an expansion chamber for collecting expansion water and drain back water, and the modulating valve has means thereon for generating a negative pressure for aspirating the collected water from the expansion chamber.

It is still another object of the present invention to provide in combination for a dispensing system a thermally actuated modulating valve and an atmospheric pressure hot water service in operative association wherein the heating and storage tank for the atmospheric pressure hot water service includes an expansion chamber for collecting expansion water and drain back water from the system, the thermally actuated modulating valves includes means for generating a negative pressure for aspirating said collected water, and the expansion tank has a cut off to prevent ambient air from being aspirated into the modulating valve when substantially all of the collected water is removed from the expansion space.

Other objects and advantages of thermally actuated modulating valves in accordance with the present invention and as utilized in combination with an atmospheric hot water service to provide heated water at a predetermined temperature will become apparent from the descriptions of the various valve systems and which follow in reference to the accompanying drawings in which:

FIG. 1 is a diagramatic sketch of an atmospheric pressure hot water dispensing system in combination with a bellows type thermally actuated modulating valve in accordance with the present invention for providing controlled heated water to the dispensing head for the dispensing system wherein the dispensing head, the bellows type thermally actuated modulating valve and the upper portion of the atmospheric hot water heating service are shown in whole or in part in cross-section.

FIG. 2 is a right side elevation view of the bellows type thermally actuated modulating valve in FIG. 1.

FIG. 3 is a left side elevation view of the bellows type thermally actuated modulating valve shown in FIG. 1.

FIG. 4 is a front view of the bellows type thermally actuated modulating valve shown in FIG. 1 showing a front view of the temperature regulating knob.

FIG. 5 is a rear view of the bellows type thermally actuated modulating valve shown in FIG. 1.

FIG. 6 is a cross-section taken on line 6—6 of the bellows type thermally actuated modulating valve shown in FIG. 1.

FIG. 7A is a side view of the temperature regulating knob.

FIG. 7B is a back view taken on line 7B—7B of FIG. 7A showing the camming surface for opening the main inlet for admitting cold source water to the thermally actuated modulating valve shown in FIG. 1.

Figure 27:
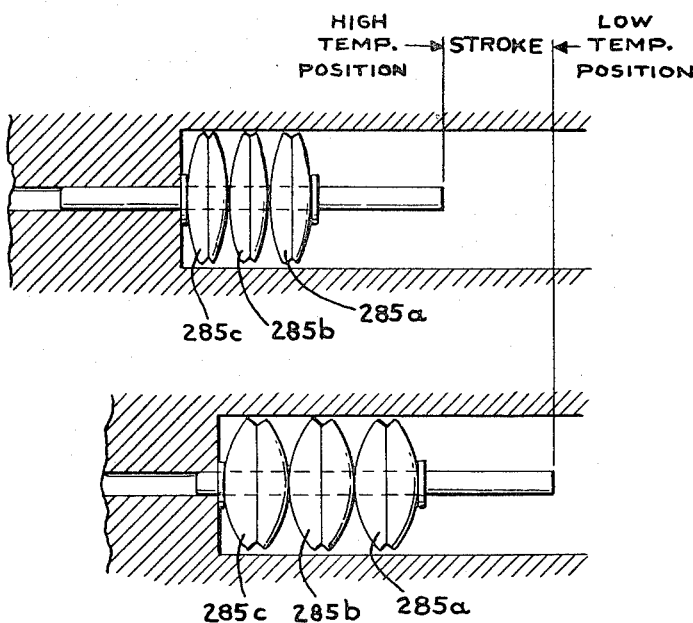

FIG. 8 is a diagramatic sketch of another atmospheric pressure hot water dispensing system in combination with a thermally actuated phase change operated type thermally actuated modulating valve in accordance with the present invention for providing temperature controlled heated water to the dispensing head for the dispensing system wherein the dispensing head, the phase change operated type thermally actuated modulating valve and the upper portion of the atmospheric hot water are shown in whole or in part in cross-section.

FIG. 9 is a right side elevation view of the phase change operated type thermally actuated modulating valve shown in FIG. 8.

FIG. 10 is a left side elevation view of the phase change operated type thermally actuated modulating valve shown in FIG. 8.

FIG. 11 is a top view of the phase change operated type thermally actuated modulating valve shown in FIG. 8.

FIG. 12 is a bottom view of the phase change operated type thermally actuated modulating valve shown in FIG. 8.

FIG. 13 is a front view of the phase change operated type thermally actuated modulating valve shown in FIG. 8.

FIG. 14 is a back view of the phase change operated type thermally actuated modulating valve shown in FIG. 8.

FIG. 15 is a cross-section taken in line 15—15 of the phase change operated type thermally actuated modulating valve shown in FIG. 8.

FIG. 16 is a diagramatic sketch of still another atmospheric pressure hot water service system in combination with a bimetallic stack type thermally actuated modulating valve in accordance with the present invention for providing temperature controlled heated water to the dispensing head for said dispensing system wherein the dispensing head, the bimetallic stack type thermally actuated modulating valve and the upper portion of the atmospheric hot water service are shown in whole or in part in cross-section.

FIG. 17 is a left side elevation view of the bimetallic stack type thermally actuated modulating valve shown in FIG. 16.

FIG. 18 is a right side elevation view of the bimetallic stack type thermally actuated modulating valve shown in FIG. 16.

FIG. 19 is a top view of the bimetallic stack type thermally actuated modulating valve shown in FIG. 16.

FIG. 20 is a bottom view of the bimetallic stack type thermally actuated modulating valve shown in FIG. 16.

FIG. 21 is a front view of the bimetallic stack type thermally actuated modulating valve shown in FIG. 16.

FIG. 22 is a back view of the bimetallic stack type thermally actuated modulating valve shown in FIG. 16.

FIG. 23 is a cross-section taken on line 23—23 of the bimetallic stack type thermally actuated modulating valve shown in FIG. 16.

FIG. 24 is a cross-section taken on line 24—24 of the bimetallic stack type thermally actuated modulating valve shown in FIG. 16.

FIG. 25 is a perspective view of one bimetallic disc assembly for use in the actuated bimetallic stack type thermally actuated modulating valve shown in FIG. 16.

FIG. 26 is a perspective view of the control knob for adjusting the operating temperature of the bimetallic stack type thermally actuated modulating valve shown in FIG. 16.

FIG. 27 is a diagramatic sketch illustrating the expansion of the bimetallic stack in the bimetallic stack type thermally actuated modulating valve shown in FIG. 16.

Figure 28:
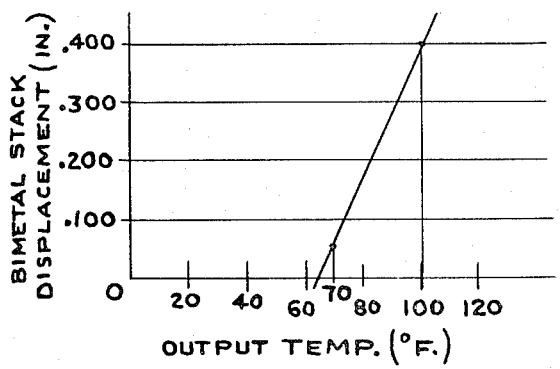

FIG. 28 is a graph showing displacement in inches of the bimetallic stack as a function of the output temperature required from the bimetallic stack type thermally actuated modulating valve shown in FIG. 16.

Figure 29:
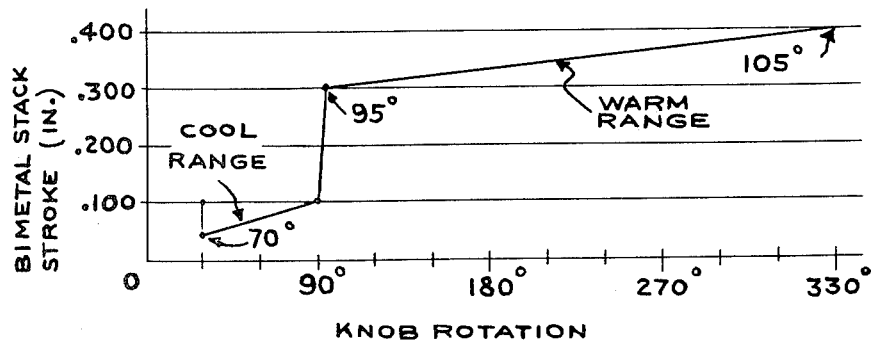

FIG. 29 is a graph showing the bimetallic stack stroke as a function of the knob setting for adjusting the delivery temperature of the water supplied from the bimetallic stack type thermally actuated modulating valve shown in FIG. 16.

THERMALLY ACTUATED BELLOWS TYPE VALVE ASSEMBLY

Referring to the drawings FIG. 1 shows an atmospheric pressure hot water dispensing system having a dispensing head generally designated 1 which functions to deliver heated water at the controlled temperature for the desired use. Cold source water is delivered from any suitable source to a bellows type thermally actuated modulating valve assembly generally designated 15 which temperature actuated modulating valve in turn acts; to control flow of predetermined quantities of water to an atmospheric pressure hot water service 60 for heating and storing the heated water; for mixing a portion of the cold source water, with a portion of the heated water, and aspirated water and for delivering the same at the predetermined temperature to the dispensing head for the desired use.

Dispensing head 1 has a dispensing nozzle 2 having an inlet end 3 for the heated water to be dispensed and a discharge outlet 4 to pass the heated water at the predetermined temperature from the system. A vent passage 2a is formed in the nozzle 2 for venting the heated water dispensing system so as to maintain the same at atmospheric pressure.

Cold source water is delivered to a main inlet as at 14 for the thermally actuated modulating valve assembly 15 and will be proportioned so that a portion thereof is delivered to an atmospheric hot water service generally designated 60 where it is heated and stored and then returned for mixture with the remaining portion of the cold source water when the thermally actuated modulating valve assembly 15 is operated as will be more fully described hereinafter.

Thermally actuated modulating valve assembly 15 has a cylindrical valve body 16 which is threaded at one end as at 16a so that the valve body can be mounted in an opening in the control panel CP. The threaded end of the valve body 16 is assembled position is held in the opening by a snap ring 16b and a nut 16c as is shown in FIG. 1 of the drawings. Extending in from one end of the valve body 16 is a longitudinally extending bore which defines an inlet chamber 7 communicating at the medial section thereof with an inlet 14 so that when the control valve 8 is moved to open position water will pass through the outlet thereof and through connecting line 8 to the inlet 14 for the inlet chamber 17 of the temperature actuated valve assembly 15. An outlet orifice 18 is formed at the inner end of the inlet chamber 17.

An elongated rod 19 having a narrow projecting finger 20 is slidably disposed in the inlet chamber 17 in fluid tight seal therewith by an O-ring seal as at 21. The narrow projecting finger 20 can be moved by sliding action of the elongated rod 19 into the orifice 18.

On inward sliding movement the narrow projecting finger 20 will contact a ball 22 of ball check valve 23 and move the same to open position against the spring 24. The slidably disposed elongated rod 19 will be operated as hereinafter described.

On the downstream side of the ball check valve assembly 23 the water from orifice 18 passes through a flow regulating device 25 and a suitable filter 25a to a connecting passage 26 in communication with the inlet end of a proportioning assembly generally designated 27 for proportioning the quantity of cold water to be passed by the thermally actuated modulating valve assembly 15 to the atmospheric hot water service 60 for heating and storing the heated water for use in the operation of the dispensing system.

The proportioning assembly 27 and a thermally actuated bellows assembly 70 lie in the longitudinal axis of the cylindrical valve body 16 and are substantially in alignment with each other. By this arrangement the proportioning assembly 27 can be operated by the thermally actuated bellows assembly 70 as is more fully described below.

Proportioning assembly 27 has a proportioning chamber 28 in which a hollow portion or hollow cylindrical slide valve 29 is disposed for reciprocating movement, the thermally actuated bellows assembly 70 is in engagement with the slide valve 29 and will act to move the slide valve in one direction to decrease flow of water to the atmospheric hot water service 60 and the spring member 29a disposed to engage the slide valve 29 on the side opposite from the thermally actuated bellows assembly 70 will act to return the slide valve 29 to the calibrated setting of the thermally actuated bellow assembly 70 for establishing the temperature for the heated fluid being passed to the dispensing head 1.

Proportioning chamber 28 is provided with spaced annular outlet chambers 30 and 31 which are connected by connecting passages 32 and 33 to an outlet port 34 and return port 35 respectively. Outlet port 34 is connected by conduit 36 to the lower end of the reservoir 60a for the atmospheric hot water service 60 and therefore cold or source water directed to pass into the annular outlet chamber 30 will be delivered to the bottom of the reservoir 60a where it displaces heated water upwardly causing it to pass through the discharge outlet 37 and a connecting conduit 38 which is connected between the discharge outlet 37 and return port 35 for the connecting passage 33. In connecting passage 33 the heated water entering through return port 35 mixes with that portion of the cold or source water, which is passed by the slide valve 29 to the annular outlet chamber 31.

The slide valve 29 is a cylindrical member having an elongated bore 39 end to end therethrough which defines a flow passage having one end in communication with the connecting passage 26 so as to receive cold source water therefrom and the opposite end thereof serves as an outlet for delivering cold source water to the annular outlet chamber 31. Spaced a predetermined distance from this outlet end of the bore 39 is an inner groove 39a in the wall of the slide valve 29 which defines the bore 39 and a plurality of spaced openings as at 39b extending through the wall of the slide valve will deliver cold source water to the annular outlet chamber 30.

During the initial assembly of the thermally actuated modulating valve assembly the slide valve 29 will be positioned substantially as shown in FIG. 1 so that cold source water cannot pass to either of the annular outlet chambers 30 or 31. Further, if the thermally actuated modulating valve assembly should fail for any reason, the resilient means 29a will cause the slide valve 29 to move to this fail safe position.

In reservoirs for heating and storing water for use in the dispensing systems of the type shown in FIG. 1, an expansion space is provided as at 40 in which expansion water 41 will collect. The expansion space 40 is vented to atmosphere through a vent line 44 which is connected to the vent passage 2a in the nozzle 2 and the vent line permits the system to operate at atmospheric pressure.

Water heating and storing reservoirs for atmospheric hot water service in water dispensing which operate at atmospheric pressure are well known in the art as is shown by U.S. Pats. 3,202,321 and 3,642,176.

The expansion space 40 has an aspirating outlet 45 at the lowest point in the expansion space 40 which is connected by conduit 46 to the valve body 15 for operative association with an aspirating passage 47 found in the valve body 15 between the connecting passage 33 and a mixing chamber or passage 48. The aspirating passage 47 is disposed upstream of the point where the conduit 46 communicates with the mixing chamber 48 and is of a lesser diameter than the connecting passage 33 and the mixing chamber or passage 48 so that it acts to increase the velocity of the heated and cold source water passing from the connecting passage 33 to the mixing chamber or passage 48 and this will aspirate any expansion water or return water present in the expansion space 40, independent of the quantity of water being passed or routed through the reservoir 60a.

Aspirating outlet 45 is provided with a shut-off assembly generally designated 50 which includes valve seat 51 at the entrance to the aspirating outlet 45. A closure ball 52 which rises and falls with the expansion water in the expansion space 40 is disposed in a cage 53 mounted between the valve seat 51 and the inside surface of the expansion chamber head 40a. A closure cap 54 provides access to the expansion chamber 40 and permits placing the closure ball 52 in the cage 53 for coaction with the valve seat 51 all of which is clearly shown in FIG. 1 of the drawings.

When the expansion water 41 and drop back water collected in the expansion space 40 is aspirated from the expansion space 40 the closure ball 52 will, as it approaches the lowest point in the expansion space 40, engage the seat 51 and prevent air from being withdrawn from the expansion space and mixed with the heated water being transmitted to the thermally actuated valve assembly 15. The introduction of air into the mixture of cold water, hot water and collected water from the expansion space 40 is detrimental to the operation of the thermally actuated modulating valve 15 and is therefor to be avoided because it will cause uneven transmission of the water mixture but more important it imposes an instantaneous change in the temperature of the water mixture which will produce an unduly large response from the thermal power actuator 70 which operates the proportioning assembly 27 as is more fully described below. Since the thermal power actuator 70 cannot respond instantaneously there would result an overmodulation of the temperature of the water mixture being discharged from the system and thus a momentary deviation of the water mixture from the preset output temperature constant at which the system is then set.

The hollow piston or slide valve 29 is sized so for operative association with the spaced annular outlet chambers 30 and 31. Thus, when cold or source water is delivered to the proportioning chamber 28 through the connecting passage 26 depending on the position of the hollow piston or slide valve 29, a portion thereof as a function of the position of the slide valve; and in ratio to that position; will pass to the respective annular outlet chamber 31 and through the medially disposed plurality of openings 39b to the annular outlet chamber 30.

The predetermined length or distance between the end of the slide valve 29 which delivers cold source water to the annular outlet chamber 31 and the plurality of openings 39b establishes the proportional band operation of the proportioning assembly 27. The longer the predetermined length or distance is between the end of the slide valve 29 and the openings 39b, the longer the percent of the proportional band and this will generate a more sensitive thermally actuated modulating valve. If the length or distance is shorter than the outer dimensions of the spaced annular chambers 30 and 31 the percent of the proportional band is smaller because in effect the cold water flow will be basically constant while only the hot water flow will change thus decreasing the sensitivity of the thermally actuated modulating valve. Too high a percentage proportional band will tend to make the system over modulate and too low a percentage proportional band will result in delayed or lack of response resulting in wide variations in output temperature of the water mixture being delivered under either of these extended conditions.

Additionally, it will be noted that the spaced annular outlet chambers 30 and 31 have a rectangular shape as distinguished from the conventional cylindrical port type shape. This rectangular shape greatly increases the change in flow to the system as the hollow piston or slide valve 29 is moved relative the respective annular outlet chambers 30 and 31.

A cross pin 55 transversely mounted in the slide valve 29 is engaged by the drive shaft 56 of the thermally actuated bellows assembly 70 to position the slide valve 29 in accordance with the temperature setting for the heated water mixture to be delivered to the dispensing head 1.

The thermally actuated bellows assembly lies in a centrally disposed bore or transfer chamber 71 and the drive shaft 56 extends through the drive shaft opening 72 between the central bore or transfer chamber 71 and the proportioning chamber 28 and will be sealed by a low friction packing 73 including a lip seal as at 74 as is shown in FIG. 1 of the drawings. The low friction packing is to minimize hysteresis, i.e. the lost motion of the slide valve 29, during periods when the direction of the movement of the slide valve 29 changes.

The centrally disposed bore or transfer chamber 71 has an inlet port 75 which lies in the valve body 15 between the mixing chamber or passage 48 and the transfer chamber 71 to permit the mixture of cold source water, heated water and aspirated expansion space water to be passed to the transfer chamber 71, and an outlet port 76 which is connected by discharge line 77 to the inlet 3 of the dispensing nozzle 2 so that the mixture of cold source water; heated water, and aspirated expansion space water can be passed from the system through the dispensing outlet 4 on the nozzle 2.

The thermally actuated bellows assembly 70 includes a bellows member 78 which lies in the transfer chamber 71 and is connected at one end to the drive shaft 56 and at the opposite end is connected through coupling 79 to the regulating and temperature setting assembly generally designated 80.

However, because the bellows member 78 lies in the transfer chamber 71, it will be clear that the bellows member 78 will sense the temperature of the mixture of cold source water, heated water and expansion water and will expand or contract depending on the relative temperature thereof. Since the end thereof in contact with coupling 79 is only moved when the setting is changed, only the end thereof connected to the shaft 56 will move in ratio to the expansion and contraction of the bellows member 28. Since this end is in contact with the cross pin 55 of the proportioning slide valve 29, the slide valve 29 will by reason of the spring 29a follow the movement of the drive shaft 56.

The regulating and temperature setting assembly 80 has a temperature adjusting element 81 which is cylindrical and sized to fit into the open end of the central bore or transfer chamber 71 where it is held by a wire clip 82 extending through openings as at 83a and 83b so the adjusting member 81 can be rotated about the longitudinal line of the thermally actuated bellows assembly 70 in the longitudinal line of the thermally actuated bellows assembly 70 the temperature adjusting element 81 has a bore 84 end to end therethrough which is threaded as at 85 in the end thereof adjacent the bellows 78 to receive a threaded calibrating screw 86 which extends beyond the end of the adjusting element 81 for engagement with the coupling 79. A packing 87 provides a fluid tight seal about the calibrating screw 86 and a slot 88 in the head of the calibrating screw 86 is accessible from the exterior portion of the adjusting element 81 to permit the calibrating screw 86 to be adjusted in accordance with the temperature range in which it is desired to fix the operation of the thermally actuating proportioning valve 15.

The coupling illustrated is a free turning ball bearing so that the bellows has a universal low torque coupling effect between the fixed end of the calibrating screw 86 and the adjacent end of the bellows 78.

The temperature adjusting element 81 can be rotated from a closed position wherein flow of source water to the system is prevented to a fully open or maximum position where a proportionally large amount of the flow passing through the system is passed directly to the heating and storing reservoir 60. Once the thermally actuating proportioning valve 15 is moved to open position, it is then set so that at midpoint of the operating range the proportioning slide valve 29 will be set so that the desired ratio of cold water will pass through connecting passage 32 for delivery to the heating and storage reservoir to displace heated water therefrom as above described and through the connecting passage 33 for mixture with this heated water and the aspirated water drawn from the expansion space 40 also as above described. This adjustment is made with the calibrating screw but with the thermally actuated proportioning valve 15 in the open position by measuring the temperature of the water discharged from the outlet floor of the discharge nozzle 2.

Further referring to FIGS. 1, 2, 3 and 4 of the drawings the temperature adjusting element 81 of the regulating and temperature setting assembly 80 is shown as further including an annular flange 90 about the exterior end thereof and on the inner face of flange 90 a cammed surface 91 is provided for contact with the exterior end of the control rod 19 which is aligned for engagement therewith and movement by the cam surface 91 when the temperature adjusting element 81 is rotated in a clockwise direction. The cam surface 91 will move the control rod 19 parallel to the longitudinal axis of the thermally actuated proportioning valve 15 so that the projecting finger 20 will move the check valve ball 22 off its seat opening the orifice 18 and compressing the spring 24 to thereby permit cold source water to enter the thermally actuated proportioning valve whenever the handle 13 is manually depressed.

The cam surface 91 is contoured as is shown in FIGS. 7a and 7b.

The temperature setting at which the system will operate is set by a manually operated control handle or knob 95 which is provided with a line mark as at 96 in the outer periphery thereof for reading the temperature setting position of the thermally actuated proportioning valve 15 from a temperature indicia dial 97. Temperature indicia dial 96 and a handle or knob support 98 are disposed about the exterior end of the threaded portion 16a of the valve body 16 and further are held in fixed position against the control panel CP by means of the snap ring 16b which coacts with the nut 16c to hold the valve body 16 in assembly position on the control panel.

The knob support 97 is a cup shaped cylindrical member with an annular guide rim 99 formed in the side wall thereof. The knob 95 is grooved as at 100 and can be snapped onto the guide rim 99 as is shown in FIG. 1 of the drawings.

Further as shown in FIG. 1 the knob 95 has a center protrusion 101 which fits into the open end of the bore 84 in the temperature adjusting element 81. The center protrusion is removably connected in the bore 84 and will fit or can have some other affirmative means such as the spline 102 or a pawl so that when the knob 95 is rotated the temperature adjusting element 81 will rotate therewith and move on its axis without axial movement of knob 95.

The bellows member 78 is made of a material such as brass or copper alloy which can withstand long usage in the water mixture to which passes through the transport chamber 71 in which the bellows member 78 is disposed. In order to obtain a sufficient stroke of the bellows member 78 so as to move the associated piston or slide valve 29, the bellows member 78 is evacuated and charged with a volatile liquid such as a refrigerant C $CL_2F$—C Cl $F_2$ which is purchaseable on the open market under the designation R-113. The charge in saturation pressure of such volatile liquid with changes or variations in temperature will cause the liquid to exert varying pressures on the effective area of the bellows to provide the required stroke over a given range of temperature.

The expansion and contraction of the charged bellows 78 will move the driven shaft or rod 56 a proportionate amount. The expansion and contraction of the bellows 78 must be capable of providing the driven shaft or rod 56 with a stroke to move the piston or slide valve 29 axially in both directions to at least cover alternatively, selectively and respectively as a function of the temperature changes the respective annular ports or chambers 30 and 31 which communicate with the opposite ends of the proportioning chamber 28, all of which is shown in FIG. 1 of the drawings.

OPERATION

In operation the knob 95 is rotated clockwise from the closed position to a point in the temperature setting at about 165° of arc equivalent to about 105° F.

Since this will open the check valve 23 as above described, water will flow into the thermally actuated proportioning valve 15 and a mixture of cold source water, heated water and aspirated water, if any, will pass to the mixing chamber 48 and thence through the transfer chamber 71, outlet 76 and line 77 to the dispensing nozzle 3 where it will pass from the outlet thereof where the temperature can be measured.

The knob 95 is now removed and the calibrating screw adjusted until the measured temperature of the water flowing from the outlet 4 corresponds to the mid point temperature setting of about 105° F. The knob 95 is now replaced and the system is ready for normal operation.

If the knob 95 is reset at a different temperature, then the temperature of the mixture of cold source water, heated water, and aspirated water flowing through the transfer chamber 71, will cause the bellows to expand or to contract so as to increase or decrease the flow of cold source water to the heating and storage reservoir 60 and thus vary the temperature of the water mixture until the temperature thereof is at the new temperature set by the knob 95. The expansion and contraction of the bellows will cause the piston or slide valve 29 to move so as to uncover more or less of the respective annular grooves or chambers 30 and 31 in communication with the proportioning chamber 28 and thus will vary or proportion the ratio of flow therethrough as above described to the heating and storage reservoir 60 and from the reservoir 60 to the connecting passage 33.

The total flow entering the proportioning chamber 28 will therefore be passed to the aspirating passage 47 and will act to aspirate any expansion water 41 collected in the collection space 40 of the heating and storage reservoir.

When the knob 95 is moved to the off or closed position so that the flow of cold source water to the system is terminated, a portion of the water mixture collected in the dispensing nozzle 3, line 77, transfer passage 71, and mixing chamber 48 will flow back through aspirating line 46 and outlet 45 into the expansion space 40. Similarly, expanded water from the heating and storage reservoir 60 will pass from connecting conduit 38 through passage 33 and aspirating passage 47 into the mixing chamber 48 and this expansion water like the fall-back water will be passed through the line 46 and outlet 45 to the expansion space 40.

When, the manual lever 13 is again depressed to start water flowing through the system to the dispensing nozzle 3 the collected water 41 in the expansion space 40 will be aspirated therefrom until the outlet 45 is closed by the ball 52 setting on the seat 51 thereof, all of which has been described and the purposes for such operation stated above.

PHASE CHANGE TYPE THERMALLY ACTUATED MODULATING VALVE

Referring to the drawings FIG. 8 shows a diagramatic sketch of another atmospheric pressure heated water dispensing system for dispensing thermostatically controlled water at a uniform temperature and in a manner to comply with voluntary codes for the building industries for conservation of hot water, more particularly for showers and for public washing facilities and in industrial, residential or commercial facilities which require or should have systems for conserving the use of hot water.

This dispensing system includes a dispensing head generally designated 110 having a dispensing nozzle and an inlet control valve 112 disposed adjacent thereto.

Control valve 112 has an inlet port 113 connected through line 114 to any suitable source of cold water supply such as city water which is delivered at pressures in a range from 20 to 100 PSIG. Inlet port 113 communicates with the valve chamber 115 in the control valve 112 and flow through the inlet port 113 is controlled by a conventional poppet valve 116 operated by the control lever 117 connected thereto as is shown in FIG. 1.

The valve chamber 115 is in turn provided with an outlet port 118 which is connected to one end of the delivery line 119 for delivering cold water from the source to the dispensing system whenever the control lever 117 is moved to the open position.

The end of delivery line 119 remote from the outlet port 118 communicates with an inlet port 120 disposed at one end of a thermally actuated phase change operated proportioning, mixing and aspirating valve assembly 121 in accordance with the present invention. The thermally actuated phase change operated, proportioning, mixing and aspirating valve 121 will be referred to hereinafter as the PMA valve and will be described more fully below.

The PMA valve 121 has a generally cylindrical valve body with two oppositely disposed and aligned bores extending therethrough, a small bore as at 122 and a relatively larger bore as at 123. The small bore provides means for slidably mounting a proportioning assembly 124 and is so disposed at the end of the cylindrical valve body that the proportioning assembly will communicate with the inlet port 120 and this receives the total volume of water delivered through the inlet port 120 into the PMA valve 121. The larger bore 123 defines a water flow transfer chamber 125 and provides means for slidably mounting a phase change power element 160 which is thermally actuated by the temperature of the water flowing through the transfer chamber 125. The phase change power element 160 is operatively connected to the proportioning assembly 124 so as to operate the same as a function of the variations in temperature of the water flowing through the transfer chamber 125. A resilient member 127 disposed in engagement with the proportioning assembly maintains the phase change element and proportioning assembly in operative contact with each other.

At the end of the phase change power element 160 remote from the proportioning assembly 124 a calibrating screw 128 is threadably connected into the end of the enlarged bore 123 for abutment with the phase change power element 160. The calibrating screw 128 is provided with an O-ring seal as at 129 for maintaining a fluid tight connection between the calibrating screw and the walls of the larger bore which defines the water flow transfer passage or chamber 125.

When the calibrating screw 128 is threaded inwardly or outwardly it will be reason of the resilient member 127 move both the phase change power element 160 and the slide valve hereinafter described of the proportioning assembly 124 an equivalent distance so as to provide a proper calibration of the PMA valve 121 for operation in the heated water dispensing system.

The proportioning assembly 124 has spaced annular grooves as at 130 and 131 disposed in the walls of the smaller bore 122 transversely of the longitudinal line thereof to permit a piston or annular slide valve 132 having a flow passage 133 therethrough to be moved by the phase change power element 160 so as to apportion or ratio the total volume of water delivered through the inlet port 120 into the smaller bore 122 so that more or less of the water will flow to one or the other of the annular grooves 130 and 131 as a function of the temperature of water flowing through the water flow transfer chamber 125 as sensed by the phase change power element 160. The manner in which the water is apportioned to flow to one or the other of the annular grooves 130 and 131 and the purpose of such apportionment will be more clearly understood from the operation of the system as described below.

The shape of the annular grooves 130 and 131 greatly increase and decrease the change in flow to the system as the piston or slide valve 132 is moved relative thereto as compared with the water flow change that would occur if the same piston or slide valve were moved the same distance across a circumferential hole or port in the smaller bore 122 defining the proportioning chamber.

Annular groove 130 is connected to the side port 134 which in turn is connected to one end of a delivery or connecting conduit 135 communicating at the other end with the bottom of an atmospheric pressure heating and storage tank 136.

Atmospheric pressure heating and storage tanks of the type utilized in the disclosed heated water dispensing system are easily purchaseable on the open market and are described in detail in U.S. Pat. Nos. 2,903,551, 3,202,321, and 3,642,176. In such heating and storage tanks, water will be heated or maintained at a predetermined fixed relatively high temperature. When cold water is delivered to the bottom of the heating and storage tank 136 hot water will be displaced through the outlet 137 thereof. In the heated water dispensing system as shown in FIG. 8 the outlet 137 of the heating and storage tank 136 is connected to one end of a return line 138 which connects at the end remote thereof with a mixing port 139. Mixing port 139 also communicates with annular groove 131 and therefore receives a ratio of or predetermined portion of the cold supply water therefrom so that in the side port 139 the heater water from the atmospheric pressure heating and storage tank 136 and the portion of the cold supply water passing through the annular groove 131 will be mixed and will be equivalent to the total volume of water delivered through the inlet port 120 to the proportioning slide valve assembly 124.

In atmospheric pressure heating and storage tank 136 similar to the prior art devices an expansion space 140 is provided in which expansion water 141 will collect. The expansion space 140 is vented to atmosphere through a vent line 142 which is connected to a vent passage 143 in the dispensing nozzle 111 of the dispensing head 110. Vent line 142 permits the system to operate at atmospheric pressure.

The expansion space 140 is provided with an aspirating outlet 144 at the lowest point in the expansion space 140. Aspirating outlet 144 is connected by connecting conduit 145 to the aspirating port 146 in the body of the thermally actuated valve assembly 121 for operative association with aspirating passage 147 disposed in the body of the valve assembly 121 between the connecting passage 139 and a mixing chamber or passage 148. The aspirating passage 147 is disposed upstream of the point where the aspirating port 146 communicates with the mixing chamber 148 and because it is of a lesser diameter than the connecting port 139 and mixing passage 148 it acts to increase the velocity of the cold source water and hot water passing from inlet port 139 to the mixing chamber or passage 148 and this will aspirate expansion water present in the expansion space 140 through the aspirating outlet 144, line 145 and aspirating port 146 into the mixing chamber or passage 148 where such expansion water is mixed with the heated water and cold source water being delivered from the connecting inlet port 139.

As in the form of the invention shown in FIGS. 1 to 7, the aspirating oulet 145 is also provided with a shut-off assembly generally designated 150 which includes valve seat 151, at the entrance to the aspirating outlet 145. A closure ball 152 which rises and falls with the expansion water in the expansion space 140 is disposed in a cage 153 mounted between the valve seat 151 and the inside of the expansion chamber head 140a. A closure cap 154 provides access to the expansion chamber 140 and permits placing the closure ball 152 in the cage 153 for coaction with the valve seat 151, all of which is shown in FIG. 8 of the drawings.

When the expansion water 141 is aspirated from the expansion space 140 the closure ball 152 will, as it reaches the lowest point in the expansion space 140, engage the seat 151 and prevent air from being withdrawn from the expansion space and mixed with the mixture of heated water and cold source water in the mixing chamber or passage 148 as such air not only would cause uneven transmission of the water mixture additionally will cool the same and this will produce an overmodulation in the system as was above described for the shut-off assembly 50 in the form of the invention shown in FIG. 1 to 7 of the drawings.

The piston or slide valve 132 is a hollow cylindrical member sized so that it has a length less than the total length between the outer side dimensions of the spaced annular grooves 130 and 131. Thus when cold source water is delivered to the porportioning chamber 122 through the inlet port 120, depending on the position of the slide valve 132, a portion of the cold source water as a function of such position and in ratio to such position of the slide valve 132 will pass respectively to the annular groove 130 and through the central passage 133 to the annular groove 131.

The length of the piston or slide valve 132 can be varied to adjust the percent proportioning band so as to make the valve operation more or less responsive to variations in the temperature flowing through the transfer chamber 125.

A cross pin 155 transversely mounted in the slide valve 132 is engaged by the drive shaft 156 of a thermally actuated phase change assembly 160 to position the slide valve 132 in accordance with the temperature setting for the heated water mixture to be delivered to the dispensing head 110.

The thermally actuated phase change assembly 126 is in the centrally disposed bore or transfer chamber 125 and the drive shaft 156 connected thereto extends through a drive shaft opening between the transfer chamber 125 and the proportioning chamber 122 for engagement with the transverse pin 155, as is shown in FIGS. 8 and 15 of the drawings.

Centrally disposed bore or transfer chamber 125 has an inlet port 157 which lies in the valve body 121 to communicate the mixing chamber or passage 148 with the transfer chamber 125 to permit the mixture of cold source water, heated water and aspirated expansion space water to be passed to the transfer chamber 125. An outlet port 158 is provided for the transfer chamber 125 and is connected by connecting conduit 159 to the inlet end of the dispensing nozzle 111 so the mixture of cold source water, heated water and aspirated expansion space water can be dispensed from the system.

The thermally actuated phase change assembly 126 includes the phase change power element 160 which lies in the transfer chamber 125. It will be clear that the phase change power element will sense the temperature of the mixture of cold source water, heated water and expansion water and will expand and contract depending on the relative temperature thereof.

Since the end of the phase change power element 160 in contact with the calibrating screw 128 is only moved when the calibrating screw is changed, the opposite end connected to the shaft 156 will move in ratio to the expansion and contraction that occurs in the phase change power element 160 depending on the temperature change of the water mixture sensed. Since this end and the shaft 156 are in contact with the cross pin 155, the proportioning piston or slide valve 132 will by reason of the spring or resilient element 127 follow the movement generated by the drive shaft 156 to reset or maintain the piston or slide valve 132 in the position set by the phase change power element 160.

Phase change power element 160 is of the squeezed-push type because it provides the relatively long stroke necessary to operate the slide valve 132. It includes a main cup shaped housing 161 and a guide section 162 which are connected so as to hold a plug diaphragm 163 in fluid tight sealing engagement when assembled in position as shown in FIG. 8 of the drawings.

One side of the diaphragm 163 defines with the cup shaped housing 161 a chamber 164 for holding a suitable phase change expansion type material generally designated 165.

Operatively connected to the plug diaphragm 163 on the side opposite from the chamber 164 is the drive shaft 156 which is slidably mounted in a guide bore 168 formed in the guide section 162.

The cup shaped housing 161 is provided with an annular flange 166 which is sized for snug slidable engagement with the inner wall of bore 123 and it is held in fluid tight engagement therewith by an O-ring 167 which acts to prevent cold supply water from leaking across the flange 166 into the mixture of heated water, cold supply water and expansion water which is flowing through the transfer chamber 125 during operation of the system.

Since the phase change power element 160 is fixed in position when temperature variations cause the phase change expansion material to expand or contract the associated diaphragm 163 and the driving shaft 156 will move accordingly to either abut the transverse wrist pin 156 and compress the resilient member 130 or contract and be followed by the transverse wrist pin 156 as the resilient member 130 expands. Thus the phase change power element 160 will act to move the slide valve 132 depending on the variations in temperature of the water flowing through the transfer chamber 125 and thus provide the required movement of the piston or slide valve 132 to apportion or ratio the cold supply water to the atmospheric pressure heating and storage tank 136 and to the mixing chamber 139 depending upon the temperature of the water mixture flowing through the transfer chamber 125 in the range of the setting established with the calibrating screw 128 and the temperature range set by the phase change expansion material 165 in the phase change power element 160.

It will be understood by those skilled in the art that the phase change power element 160 and the driving shaft 156 can be adjusted and readjusted by threading the calibrating screw 128 in or out as may be desired.

Phase change power elements of the type herein described are available on the open market and are devices which can translate temperature variations into mechanical and displacement force. This is accomplished by a thermal expansion material which achieves a full degree of expansion over a small change in temperature. The thermal expansion materials which meet this criteria can be selected for the particular conditions of operation or the control range necessary for the valve in which the phase change power element is operating.

The relatively fixed temperature of the water being delivered from nozzle 111 will be controlled based on the change in the proportion of the volume of water passed to the atmospheric pressure heating and storage tank as will now be described with reference to the operation of the heated water dispensing system shown in FIG. 8 utilizing the thermally actuated phase change operated, proportioning, mixing and aspirating valve 126 in accordance with the present invention.

CALIBRATION AND OPERATION

During calibration, the lever 117 is depressed and as fluid is passing through the system the temperature is measured at the outlet for the dispensing nozzle 111. The calibrating screw is adjusted to bring the slide valve 132 to a position where correctly proportioned quantities of cold source water are passed through the annular groove 130 to the atmospheric pressure heating and storage tank 136 and to the inlet passage 139 so as to provide the desired setting for the temperature of the water mixture being discharged.

The handle or lever 117 is now released and the system is ready for further normal operation.

In the PMA valve 121 when the lever or handle 117 is depressed, the total volume of water from the cold water supply source delivered to the inlet port 120 will be proportioned in the PMA valve 121 so as to deliver a portion thereof to an atmospheric pressure heating and storage tank 136 where it will displace an equivalent amount of heated water from the tank 136 back to the PMA valve 121 where it will mix with the remaining portion from the cold water source. This mixture which is equivalent to the original volume of water delivered to the PMA valve 121 will be utilized to aspirate collected expansion water 141 from the expansion space 140 in the heating and storage tank 136 and the entire mixture of cold water, heated water and aspirated water then will be passed through the transfer chamber in the PMA valve 121 so the temperature thereof can be sensed and utilized to actuate the phase change power element 160 for operating the proportioning assembly 124 before the entire mixture is delivered through the outlet port 158 for the transfer chamber 125 and flow passage line 159 to the dispensing nozzle 111 in the dispensing head 110.

When the handle or lever 117 is released and the flow of cold source water to the system terminated, a portion of the water mixture collected in the dispensing nozzle 111, line 159, transfer chamber 125 and mixing chamber 148 will flow back through the aspirating line 145 and aspirating outlet 144 into the expansion space 140 where it is collected and aspirated when water flow in the system is re-established.

Similarly, when lever 117 is released, expansion water from the heating and storage tank 136 will pass from the return conduit 138 to the connecting port 136, thru aspirating passage 147 and mixing chamber 148 back through the aspirating line 145 and aspirating outlet 144 into the expansion space 140.

Whenever water flows through the system to the dispensing nozzle 111, the collected water 141 in the expansion space will be aspirated therefrom until the aspirating outlet 144 is closed by the ball 152 as it settles on the seat 151 thereof, all of which has been described and the purposes for such operation stated above.

BIMETALLIC TYPE THERMALLY ACTUATED MODULATING VALVE

Referring to the drawings, FIG. 16 shows a diagramatic sketch of still another form of atmospheric pressure heated water dispensing system for dispensing thermostatically controlled water at a uniform temperature which utilizes still another form of the thermally actuated modulating valve operable to proportion the cold source water, mix the cold source and heated water, and to aspirate expansion and drainback water in accordance with the present invention.

This dispensing system includes a dispensing head, generally designated 210 having a dispensing nozzle 211 with a vent passage 212 therein for venting the system so as to maintain the same at atmospheric pressure. Dispensing nozzle 211 has an inlet end 213 for the heated water to be dispensed and a discharge outlet 214 to pass heated water at a predetermined temperature from the system.

Water from any suitable cold water source, not shown, passes from a connecting line 224 to the main inlet port 225 for a bimetallic type thermally actuated modulating valve assembly 226 in accordance with the invention and then is passed from modulating valve 226 to the dispensing system.

Thermally actuated bimetallic operated valve assembly 226 has a generally cylindrical valve body 227. Extending in from one end of the valve body 227 is a longitudinally extending bore which defines an inlet chamber 228 which communicates at one end with the inlet 225.

FIG. 16 shows that the end of the bore forming the inlet chamber 228 remote from the inlet port 225 is threaded as at 229. An elongated rod 230 having a narrow projecting finger 231 extends substantially the length of the inlet chamber so that the threaded end 232 thereon can be threaded into and out of the threaded portion 229 to move the projecting finger 231 into and out of engagement with the inlet port 225 so as to open and close the same as may be required in connection with the operation of this form of heated water dispensing system.

The elongated rod 230 is held in fluid tight relation with the inner wall of the inlet chamber 228 by means of an O-ring seal as at 223.

When the elongated rod 230 is threaded by means of the slot 234 clockwise, it will close the inlet port 225 and when threaded counterclockwise, will open the inlet port 225 to preset the total system flow required in connection with the operation of the system.

The thermally actuated bimetallic operated valve assembly 227 has two oppositely disposed and aligned central bores extending in from opposite ends thereof. A small bore defines a proportioning chamber as at 240 for slidably mounting a proportioning assembly generally designated 241, and the proportioning chamber is so disposed in the cylindrical valve body that the proportioning chamber 240 will communicate through connecting passage 242 with the inlet chamber 228 and thus receive the total volume of water delivered through the inlet port 225 to the valve body 227. A relatively larger bore 243 defines a water flow transfer chamber 244 and provides a space in which a bimetallic power element generally designated 245 is disposed as hereinafter described and thermally actuated by the temperature of the water flowing through the water low transfer chamber 244.

One end of the bimetallic power element 245 is connected to an adjacent end of the proportioning assembly 241 so as to operate the same as a function of the variations in temperature of the water flowing through the transfer chamber 244. A resilient element 241a disposed in engagement with the proportioning assembly 241 on the side thereof opposite from the bimetallic power element maintains the bimetallic power element 245 and the proportioning piston or slide valve 241 in operative contact with each other.

At the other end of the bimetallic power element 245 remote from the proportioning assembly 241 a temperature setting and calibrating assembly generally designated 246 is provided for adjustably positioning the bimetallic power element 245 and the operatively associated proportioning slide valve 241 as is required in connection with the operation of the heated water dispensing system more fully described hereinafter. Calibration by the temperature setting and calibration assembly 246 is effected by inward and outward movement and by reason of the coacting resilient member 246 will move both the bimetallic power element 245 and the proportioning slide valve 241 an equivalent distance so as to provide a proper calibration of the thermally actuated bimetallic operated valve assembly 226 for the desired operation of the heated water dispensing system in accordance with this form of the invention.

The proportioning assembly 241 has spaced annular grooves as at 250 and 251 disposed in the walls of the smaller bore transversely of the longitudinal line of the proportioning chamber 240 to permit an annular piston or slide valve 252 having a flow passage 253 therethrough to be moved by the bimetallic power element 245 to apportion or ratio the total volume of water delivered into the proportioning chamber 240 so that more or less of the water will flow to one or the other of the annular grooves 250 and 251 as a function of the temperature of water flowing through the water flow transfer chamber 244 as sensed by the bimetallic power element 245. The manner in which the water is apportioned to flow to one or the other of the annular grooves 250 and 251 and the purpose of such apportionment will be more clearly understood from the operation of the system as described hereinafter.

Annular groove 250 is connected to the side port 253 which in turn is connected to one end of a delivery or connecting conduit 254 communicating at the other end with the bottom of an atmospheric pressure heating and storage tank 255. As indicated above, atmospheric pressure heating and storage tanks of the type shown in FIG. 16 are easily purchasable on the open market and are described in detail in U.S. Pat. Nos. 2,903,551, 3,202,321 and 3,642,176, and the purpose and use of such heating and storage tank is well known.

In the heated water dispensing system shown in FIG. 16 the heating and storage tank 255 has its outlet 256 connected to one end of a return line 257 which connects at the end remote therefrom with a mixing port 258 in communication with a pre-mix chamber 259 which receives the portion of the cold source from the annular groove 251 that is not passed through the groove 250 to the heating storage tank 255. In the pre-mix chamber 259, the heated water from the atmospheric pressure heating and storage tank 255 and the portion of the cold supply water passing through the annular groove 251 will be mixed and will be equivalent to the total volume of water delivered through the inlet port 255 to the proportioning chamber 240 of the proportioning assembly 241.

In atmospheric pressure heating and storage tank 255 similar to the prior art devices, an expansion space 260 is formed in which expansion water and drain back water as at 261 will collect. The expansion space 260 is vented to atmosphere through a vent line 262 which is connected to the vent passage 212 in the dispensing nozzle 211 of the dispensing head 210. Vent line 262 permits the system to operate at atmospheric pressure.

The expansion space 260 is provided with an aspirating outlet 264 at the lowest point in the expansion space 260. Aspirating outlet 264 is connected by connecting conduit 265 to the aspirating port 266 in the valve body 227 of the thermally actuated bimetallic operated valve assembly for operative association with an aspirating passage 267 between the pre-mix chamber 259 and a main mixing chamber or passage 268. The aspirating passage 267 is disposed upstream of the point where the aspirating port 266 communicates with the main mixing chamber 268 and because it is of a lesser diameter than the pre-mix passage or chamber 259 and main mixing chamber or passage 268 it acts to increase the velocity of the heated and cold source water passing from the pre-mix chamber 259 to the main mixing chamber or passage 268 and thus will aspirate collected water present in the expansion space 260 through the aspirating outlet 264 line 265 and aspirating port 266 where such collected water mixed with the heated water and cold source water being delivered from the pre-mix chamber 259.

As in the earlier forms of the heated and dispensing system above described, the aspirating outlet 264 for the heating and storage tank 255 is also provided with a shut-off assembly generally designated 270.

The shut-off assembly 270 includes a valve seat 271 at the entrance to the aspirating outlet 264 and a closure ball 272 which rises and falls with the collected water in the expansion space. Closure ball 272 is disposed in a cage 273 mounted between the valve seat 271 and the inside wall 260a of the expansion chamber. A closure cap 274 provides access to the expansion chamber 260 and permits placing the closure ball 272 in the cage 273 for coaction with the valve seat 271, all of which is shown in FIG. 16 of the drawings.

When the collected expansion water and drain back water 261 is aspirated from the expansion space 260, the closure ball 272 will, as it reaches the lowest point in the expansion space 260, engage the valve seat 271 and prevent air from being withdrawn from the expansion space and mixed with the mixture of heated water and cold source water in the main mixing chamber of passage 268 for the same reasons as stated above for the shut-off assemblies shown in the earlier forms of the present invention as described.

Referring now to the piston or slide valve 252, this element is a hollow cylindrical member sized to the desired length relative the total length between the outer side dimensions of the spaced annular grooves 250 and 251 to provide the proportional band for the desired sensitivity of operation. When cold source water is delivered to the proportioning chamber 240 through the inlet port 225 depending on the position of the slide valves 252 a portion of the cold source water as a function of such position and in ratio to such position of the slide valve 252 will pass respectively through the central passage 253 to the annular groove 250 and to the annular groove 251 as is shown in FIG. 16 of the drawings.

FIGS. 16 and 23 further show that a cross pin is provided at 275 transversely of the longitudinal line of the slide valve 252 and the cross pin 275 is engaged by a drive shaft 276 of the bimetallic power element 245 to position the slide valve 252 in accordance with the temperature setting established by the temperature setting and calibrating assembly 246 for the heated water mixture to be delivered to the dispensing head 210.

The bimetallic power element 245 in the centrally disposed bore forming the transfer chamber 244 and the drive shaft 276 thereon extends through a drive shaft opening 277 between the transfer chamber 244 and proportioning chamber 240 so as to permit the driving shaft 276 to engage the transverse cross or wrist pin 275. The drive shaft opening 277 is sealed by a lip ring seal 278 all of which is shown in FIGS. 16 and 23 of the drawings.

Centrally disposed bore or transfer chamber 244 has an inlet port 279 which lies in the valve body 227 so as to communicate the main mixing chamber or passage 268 with the transfer chamber 244 to permit the mixture of cold source water, heated water and aspirated expansion space water to be passed to the transfer chamber 244. An outlet port 280 is provided for the transfer chamber 244 and is connected by connecting conduit 281 to the inlet end 213 of the dispensing nozzle 211 so that the mixture of cold source water, heated water and aspirated expansion space water can be dispensed through the outlet 214 of the dispensing nozzle 211.

The end of the bimetallic power element remote from the driving shaft 276 is in intimate contact with; and free to rotate relative to the temperature setting and calibrating assembly 246. The temperature setting and calibrating assembly 246 is provided for calibrating the position of the piston or slide valve 252 and to set the temperature at which the heated water dispensing system as shown in FIG. 16 will operate. Hence, the bimetallic power element will be moved by the temperature setting and calibrating assembly 246 during calibration and each time that a new temperature setting is provided for the dispensing system.

However, because the bimetalic power element lies in the transfer chamber 244 it will be clear that as it senses the changes in temperature of the mixture of cold source water, heated water and aspirated expansion space water that it will expand and contract independently of the calibrating and temperature setting assembly 246 and because of its operative association with the slide valve 252 will move the same in direct ratio to the expansion and contraction which occurs in the bimetallic power element because the end of the driving shaft 276 is in contact with the cross pin 275 on the slide valve 252 and thus the proportioning assembly 241 will be operated to vary and proportion the amount of cold source water which is passed to the bottom of the heating and storage tank 255. Thus, the heated water delivered to the dispensing nozzle will be maintained at the temperature setting provided by the calibrating and temperature setting assembly 246.

Bimetallic power element 245 consists of a plurality of bimetallic units as at 285a, 285b, and 285c which are disposed and mounted about the drive shaft 276 for abutment with the calibrating and temperature setting assembly 246 and at the end remote therefrom with an annular stop member 286. Each of the bimetallic units includes a pair of opposing concave and convex bimetallic discs as at 287 and 288 as is shown in FIGS. 16 and the enlarged perspective view, partially broken away, of bimetallic unit 285a in FIG. 25 of the drawings.

The manner in which the bimetallic power element 245 changes its stroke with an increase or decrease in temperature of the water flowing through transfer chamber 244 is illustrated in FIG. 27 of the drawings. FIG. 28 is a graph showing a typical change in inches of movement as a function of the output temperature of the heated water dispensed from the heated water dispensing system shown in FIG. 16. In FIG. 28 of the drawings, it can be seen that the displacement or stroke of the bimetallic power element can be made proportional to the desired changes in temperature.

The temperature setting and calibration assembly 246 includes a cylindrical knob 290 which is sized for snug engagement with the wall of the centrally disposed bore 243 defining the transfer chamber 244. The knob 290 is maintained in assembled position by a fixed pin 291 which engages a temperature setting groove 292. O-ring seals as at 293 and 294 are provided to maintain the knob in fluid tight engagement with the inner wall of the bore 243.

The outer end of the knob 290 is provided with a hexagonal fitting 294 which can be engaged by any suitable type of tool, wrench, or removable handle to move the knob either clockwise or counterclockwise as may be necessary for setting the desired temperature for the heated water dispensing system as shown in FIG. 16. As is more clearly shown in FIG. 26 the temperature setting groove 292 coacts with the fixed pin 291 which extends inwardly from the inner wall of the bore 243 so that it rides in the temperature setting groove 292 as the knob 290 is rotated either clockwise or counterclockwise.

The temperature setting groove 292 has a profile which permits the heated water dispensing system to maintain the output temperature in a warm range for substantially the greater proportion of the adjustment position of the knob 290 and the cool range in a relatively smaller area of movement of the bimetallic power element which is desirable in certain applications of the heated water dispensing system designed to conserve energy.

In order to set the proportioning slide valve 252 the knob 290 is provided with a threaded bore as at 295 in which a threaded member 296 is mounted. The threaded member 296 is provided with a slot as at 297 so it can be threaded into and out of the threaded bore 295. A jack shaft 298 in slidable engagement with one end of the drive shaft 276 remote from the proportioning assembly and has an annular shoulder 299 which engages the bimetallic element 285c. The jack shaft 298 extends into a bore 300 in the threaded member 296 and a ball member 301 in the bore 300 provides a universal bearing surface between the threaded member 296 and the end of the jack shaft 298 remote from the annular shoulder 299 so that on rotation of the threaded member 297, only the thrust forces can be fully transmitted to the jack shaft 298 and the associate drive shaft 276 and bimetallic elements 285a, 285b and 285c.

Thus the temperature actuated modulator valve assembly 226 has means for calibrating the initial position of the slide valve 252 and further means for actuating the slide valve to adjust its position to maintain the temperature set by the temperature setting assembly and calibrating assembly 246.

OPERATION

In operation the elongated control rod 230 is threaded outwardly to open the inlet valve 225 and fluid will start to flow through the system, hot water being returned from the heating and storage reservoir 255, mixed in the thermally actuated modulating valve assembly 227 and delivered through the transfer chamber 244 to the outlet 281 and thence to the dispensing nozzle 211 as has been above described.

Calibration of the system is accomplished with the flow of water continuing by adjusting the temperature setting and calibrating assembly 246 at the mid-range and then threading the calibrating screw 296 inwardly or outwardly until the proportioning piston or slide valve 252 is set to provide the mixture of cold water, heated water and aspirated expansion space water at the desired temperature pre-set by the temperature setting and calibrating assembly 246.

The control rod 230 can be closed and the system is ready for operation whenever the control rod is moved to restart flow through the inlet 225 for the system. The controlled total volume of water from the cold water supply source delivered through the inlet port 225 will be proportioned in the thermally actuated modulating valve assembly 226 so as to deliver a portion thereof to the atmospheric pressure heating and storage tank 255 where it will displace an equivalent amount of very hot water from the tank 255 back to the valve housing 227 where it will mix with the remaining portion of the cold source water in the pre-mix chamber 259. This water mixture which is equivalent to the original volume of water delivered through inlet 225 to the valve housing 227 will be utilized to aspirate collected expansion water and drain back water 261 from the expansion space 260 in the heating and storage tank 255 and the entire mixture of cold source water, heated water and aspirated expansion chamber water now passed through passage 267 to the main mixing chamber 268 will flow through the transfer chamber 244 so that the temperature thereof can be sensed and utilized to actuate the bimetallic power element 245 for operating the proportioning slide valve 252 before the entire mixture is delivered through the outlet port 280 and line 281 to the inlet 213 of the dispensing nozzle 211 and dispensed through the outlet port 214 thereof in the dispensing head 210.

When the control rod 230 closes the inlet 225 the flow of cold source water to the system will be terminated. A portion of the water mixture collected in the dispensing nozzle 211, line 281 transfer chamber 244 and main mixing chamber 268 will flow back through the aspirating line 265 and aspirating outlet 264 into the expansion space 260 where it is collected and again aspirated when water flow in the system is recommenced. Similarly expansion water from the heating and storage tank 255 will pass from the return conduit 257 and the associated ports and passages back through the aspirating port 266, line 265 and aspirating outlet 264 back to the expansion space 260 where it is collected and aspirated in the same manner all of which has been above described.

As in the form of the invention above described in FIGS. 1 to 7, this system is also provided with a cut-off valve 305 in the inlet line 224 which will be normally open but can be moved to closed position when the temperature sensed by sensor 306 in the outlet line 281 reaches some predetermined maximum.

While the foregoing description illustrates various preferred embodiments of apparatus and systems in accordance with the present invention, it will be appreciated that certain changes and modifications may be made in the structure of these disclosed arrangements without departing from the spirit and scope of the invention and that the same is defined by the claims as hereinafter set forth.

What is claimed is:

1. A thermally actuated modulating valve comprising,
    a. valve body means having an inlet means for providing the total volume of cold source water delivered to the valve, and an outlet means for a heated water mixture,
    b. said valve body means having a bore at one end defining a transfer chamber for the heated water mixture connected to said outlet means,
    c. a proportioning assembly formed in the valve body means at the end opposite from said bore for proportioning the flow of at least a portion of said cold source water to be heated,
    d. a mixing space in said valve body means connected to said proportioning assembly to receive cold source water and said heated portion of the cold source water, and said mixing space connected to said transfer chamber to deliver the heated water mixture thereto,
    e. a thermally actuated power element mounted in the bore in said valve body means so as to lie in said transfer chamber and responsive to variations in temperature of the heated water passing through said transfer chamber to the outlet means,
    f. said thermally actuated power element operatively connected to said proportioning assembly for actuating the same to deliver varying volumes of cold source water to be heated in accordance with variations in the temperature of the heated water passing through said transfer chamber, and
    g. a temperature setting assembly for setting the temperature of the heated water mixture to be delivered from the outlet means of said thermally actuated modulating valve.

2. In a thermally actuated modulating valve as claimed in claim 1 including,
    a. said modulating valve having passage means for connecting said mixing space to said transfer chamber, and
    b. aspirating means having, an inlet operatively associated with the downstream side of said mixing space to receive the total mixture of cold source water and heated water therethrough for operation of said aspirating means, and an outlet connected to said passage means to pass aspirated fluid with the heated water mixture flowing from said mixing space through said passage to the transfer chamber.

3. A thermally actuated modulating valve comprising,
    a. valve body means having an inlet means for providing the total volume of cold source water delivered to the valve, and an outlet means for a heated water mixture,
    b. said valve body means having a bore at one end defining a transfer chamber connected to said outlet means for delivering the heated water mixture thereto.
    c. a proportioning assembly formed in said valve body means at a point remote from the bore therein including,
        1. a proportioning chamber having an inlet connected to said inlet means to receive the cold source water,
        2. spaced outlet means disposed for communication with said proportioning chamber, and
        3. slide valve means to vary the volume of cold source water delivered to at least one of said spaced outlets,
    d. said valve body means also having a mixing space connected to receive cold source water directly from one of said spaced outlets and heated cold source water indirectly from the other of said spaced outlets, and said mixing space connected to deliver the heated water mixture to said transfer chamber,
    e. a thermally actuated power element mounted in the bore of said valve body means and disposed in the transfer chamber for actuation by variations in temperature of the heated water passing therethrough,
    f. said thermally actuated power element operatively connected to said slide valve means for moving the same in accordance with said variations in the temperature of the heated water, and
    g. a temperature setting assembly for setting the temperature of the heated water mixture to be delivered from the outlet means of said thermally actuated modulating valve.

4. In a thermally actuated modulating valve as claimed in claim 3 wherein said valve body means includes,
    a. passage means for connecting said mixing space to said transfer chamber, and
    b. aspirating means having an inlet in communication with the downstream side of said mixing space and having an outlet for delivering aspirated fluid with the heated water mixture passing through said passage means from said mixing space to said transfer chamber.

5. In a thermally actuated modulating valve as claimed in claim 3 wherein said temperature setting assembly includes calibrating means for calibrating the initial position of said slide valve in accordance with the desired temperature setting at which the heated water is to be delivered from said outlet means for the thermally actuated modulating valve.

6. In a thermally actuated modulating valve as claimed in claim 3 wherein, a. said transfer chamber and said proportioning chamber are in alignment with each other, and said valve body means includes an opening therebetween,
b. said thermally actuated power element including an operating shaft extending through said opening into said proportioning chamber for operative engagement of said slide valve means, and
c. lip seal means disposed in said opening and about the operating shaft to provide a fluid tight seal.

7. In a thermally actuated modulating valve as claimed in claim 3 wherein,
a. said spaced outlet means are disposed transverse to the longitudinal axis of the modulating valve and are in the form of grooves which are rectangular in cross-section with the open end of said grooves facing the proportioning chamber, and
b. said slide valve means mounted in said proportioning chamber and movable in the longitudinal line of said modulating valve so that relatively small incremental steps of said slide valve will increase and decrease large flow areas through the open portion of the respective spaced outlet means.

8. In a thermally actuated modulating valve as claimed in claim 3 wherein said thermally actuated power element includes,
a. a bellows member, and
b. said bellows member charged with a refrigerant and the like material highly responsive to small variations in temperature.

9. In a thermally actuated modulating valve as claimed in claim 3 wherein said thermally actuated power element includes,
a. a housing assembly,
b. phase change material in said housing,
c. a plug diaphragm movable responsive to expansion and contraction of said phase change material, and
d. a drive shaft connected at one end to said plug diaphragm for movement therewith and operatively connected at the end remote therefrom to said slide valve.

10. In a thermally actuated modulating valve as claimed in claim 3 wherein said thermally actuated power element includes,
a. drive shaft means extending through said transfer chamber coupled at one end to said temperature setting assembly and to the opposite end to said slide valve means,
b. a plurality of bi-metallic discs stacked on the portion of said drive shaft in said transfer chamber and operatively connected to move said drive shaft by expansion and contraction of the bi-metallic stacked discs with variations in the temperature of the heated water passing through transfer chamber.

11. In a thermally actuated modulating valve as claimed in claim 3 including,
a. an operating rod for opening and closing said inlet means,
b. said temperature setting means including, a knob having, a cam surface thereon, and operating grooves for setting the desired temperature,
c. said cam surface operatively connected to said operating rod for moving the same on rotation of said knob to a given temperature setting.

12. In a thermally actuated modulating valve as claimed in claim 11 wherein said cam surface is shaped as a function of operating grooves in said knob means for varying the temperature setting of the heated water delivered by the outlet means for said modulating valve.

13. In a thermally actuated modulating valve assembly,
a. valve body means having an inlet means for providing the total volume of cold source water delivered to the modulating valve, and an outlet means for a heated water mixture,
b. said valve body means having a bore at one end defining a transfer chamber connected to said outlet means for delivering the heated water mixture thereto,
c. a proportioning assembly formed at the other end of said valve body means including,
  1. a proportioning chamber having an inlet connected to said inlet means to receive the cold source water,
  2. space outlet means disposed for communication with said proportioning chamber, and
  3. slide valve means to vary the volume of cold source water delivered to at least one of said spaced outlets,
d. heating and storage means connected to said at least one spaced outlet means to receive the varying volumes of cold source water therefrom and adapted to displace corresponding varying volumes of heated water from said heating and storage means,
e. said valve body means having a mixing space connected to receive cold source water directly from another of said spaced outlet means and heated water from said heating storage means, and said mixing space connected to deliver the heated water mixture to said transfer chamber,
f. a thermally actuated power element mounted in the bore in said valve body means and disposed in the transfer chamber for actuation by variations in temperature of the heated water passing therethrough,
g. said thermally actuated power element operatively connected to said slide valve means for moving the same in accordance with the variations in the temperature of said heated water passing through said transfer chamber, and
h. a temperature setting assembly for setting the temperature of the heated water mixture to be delivered from the outlet means of said thermally actuated modulating valve assembly.

14. In a thermally actuated modulating valve assembly as claimed in claim 13 wherein said temperature setting assembly includes,
a. calibration means connected to said slide valve, and
b. an adjustable means on said calibration means for calibrating the initial position of said slide valve to permit variations in the setting of the temperature of the heated water to be delivered from the outlet means of said thermally actuated modulating valve assembly.

15. In a thermally actuated modulating valve assembly as claimed in claim 13 wherein;
a. said heating and storage means includes, an expansion space for collecting expansion and other water therein,
b. an aspirating means including, a drain outlet at the lower most end of said expansion space on the heating and storage means, and an inlet for driving said aspirating means connected downstream of the mixing space to receive the total volume of heated water mixture therefrom, and an outlet for delivering said heated water mixture and aspirated water from said expansion space to said transfer chamber.

16. In a thermally actuated modulating valve assembly as claimed in claim 15 including, cut-off means operative to close said drain outlet at any time that the water in said expansion space drops to the lowermost level thereof.

17. In a thermally actuated modulating valve assembly as claimed in claim 13 including,
   a. passage means for connecting said mixing space to said transfer chamber,
   b. said heating and storage means includes, an expansion space for collected expansion and other water therein,
   c. a drain outlet at the lowermost end of said expansion space,
   d. an aspirating means in said modulating valve connected to said drain outlet for aspirating collected water from said expansion space,
   e. said aspirating means having, an inlet for driving said aspirating means connected downstream of said mixing space to receive the total volume of the heated water mixture therefrom, and an oulet connected to said passage means for delivering said heated water mixture and aspirated water from said expansion space to said transfer chamber.

18. In a thermally actuated modulating valve assembly as claimed in claim 17 including, cut-off means operative to close said drain outlet at any time that collected water in said expansion space drops to the lowermost level therein.

19. In a thermally actuated modulating valve assembly as claimed in claim 13 wherein said temperature setting assembly includes calibrating means for calibrating the initial position of said slide valve in accordance with the desired temperature setting at which the heated water is to be delivered from said outlet means for the thermally actuated modulating valve.

20. In a thermally actuated modulating valve assembly as claimed in claim 13 wherein,
   a. said transfer chamber and said proportioning chamber are in alignment with each other, and said valve body means includes an opening therebetween.
   b. said thermally actuated power element including an operating shaft extending through said opening into said proportioning chamber for operative engagement of said slide valve means, and
   c. lip seal means disposed in said opening and about the operating shaft to provide a fluid tight seal.

21. In a thermally actuated modulating valve assembly as claimed in claim 13 wherein,
   a. said spaced outlet means are disposed transverse to the longitudinal axis of the modulating valve and are in the form of grooves which are rectangular in cross-section with the open end of said grooves facing the proportioning chamber, and
   b. said slide valve means mounted in said proportioning chamber and movable in the longitudinal line of said modulating valve so that relatively small incremental steps of said slide valve will increase and decrease large flow areas through the open portion of the respective spaced outlet means.

22. In a thermally actuated modulating valve assembly as claimed in claim 13 wherein said thermally actuated power element includes.
   a. a bellows member, and
   b. said bellows member charged with a refrigerant and the like material highly responsive to small variations in temperature.

23. In a thermally actuated modulating valve assembly as claimed in claim 13 wherein said thermally actuated power element includes,
   a. a housing assembly,
   b. phase change material in said housing,
   c. a plug diaphragm movable responsive to expansion and contraction of said phase change material, and
   d. a drive shaft connected at one end to said plug diaphragm for movement therewith and operatively connected at the end remote therefrom to said slide valve.

24. In a thermally actuated modulating valve assembly as claimed in claim 13 wherein said thermally actuated power element includes,
   a. drive shaft means extending through said transfer chamber coupled at one end to said temperature setting assembly and to the opposite end to said slide valve means,
   b. a plurality of bi-metallic discs stacked on the portion of said drive shaft in said transfer chamber and operatively connected to move said drive shaft by expansion and contraction of the bi-metallic stacked discs with variations in the temperature of the heated water passing through said transfer chamber.

25. In a thermally actuated modulating valve assembly as claimed in claim 13 including,
   a. an operating rod for opening and closing said inlet means,
   said temperature setting means including, a knob having, a cam surface thereon, and operating grooves for setting the desired temperature,
   c. said cam surface operatively connected to said operating rod for moving the same on rotation of said knob to a given temperature setting.

26. In a thermally actuated modulating valve assembly as claimed in claim 13 wherein said cam surface is shaped as a function of operating grooves in said knob means for varying the temperature setting of the heated water delivered by the outlet means for said modulating valve.

27. In an atmospheric pressure heated water dispensing system,
   a. dispensing head means having a discharge outlet for dispensing heated water from said dispensing system,
   b. a thermally actuated modulating valve including,
      1. valve body means having an inlet means for providing the total volume of cold source water delivered to the modulating valve, and an outlet means for heated water connected to the discharge outlet in the dispensing head,
      2. said valve body having a bore at one end defining a transfer chamber for delivering the heated water mixture thereto,
      3. a proportioning assembly formed in the valve body means at the end opposite from the bore having an inlet connected to said inlet means, spaced outlet means, and slide valve means to vary the volume of cold water delivered to at least one of said spaced outlet means,
      4. a thermally actuated power element mounted in said bore and disposed in the transfer chamber for actuation responsive to variations in the temperature of the heated water mixture passing therethrough, and 5. said power element operatively connected to the slide valve means for moving the same in accordance with variations in the temperature of the heated water mixture, c. heating and storage means connected to said at least one spaced outlet means to receive the varying volumes of cold source water therefrom and adapted to displace corresponding varying volumes of heated water from said heating and storage means, d. said valve body having a mixing space connected to receive cold source water directly from another of said spaced outlet means and heated water from said heating and storage means, and said mixing space connected to the transfer chamber to deliver the mixture of cold source water and heated water thereto, e. a temperature setting assembly for setting the temperature of the heated water to be delivered from the discharge outlet in the dispensing head.

28. In an atmospheric pressure heated water dispensing system as claimed in claim 27 wherein, a. said heating and storage means includes, an expansion space for collecting expansion water and drain back water from the dispensing system, and a drain outlet for draining collected water from said expansion space, and b. an aspirating assembly connected to said drain outlet having, an inlet downstream from the mixing space to receive the total volume of the heated water mixture for driving the said aspirating means so as to drain collected water from said expansion space when heated water is being discharged from the dispensing system, 29. In an atmospheric pressure heated water dispensing system as claimed in claim 28 including, cut-off means in said expansion space operative to close said drain outlet when the level of water in said expansion space drops to the level of the drain outlet.

30. In an atmospheric pressure heated water dispensing system as claimed in claim 27 wherein said temperature setting assembly includes, a. calibrating means, and b. adjustable means on said calibrating means operatively connected to the slide valve means to set the initial position of the slide valve as a function of the range of temperature variations at which the dispensing system will operate.

31. In an atmospheric pressure heated water dispensing system as claimed in claim 27 including, a. control rod means to adjustably open the inlet means for varying the total volume of water delivered to the system, b. said temperature setting assembly including, a control knob having grooves for setting the temperature at which water will be delivered in the system, and a cam surface thereon, c. said cam surface operative to move said control valve to open the inlet means when the control valve is rotated to a given temperature setting, and d. said cam surface shaped as a function of the temperature setting grooves.

32. In an atmospheric pressure heated water dispensing system as claimed in claim 27 including.

a. safety valve means in said inlet mean normally maintained open to permit the free flow of water therethrough when the inlet means is moved to open position, b. sensing means connected to said outlet means for sensing the temperature of the heated water delivered through said outlet means, and c. said sensing means operative to close said safety valve when the temperature of the heated water mixture passing through said outlet means exceeds a predetermined maximum temperature.

33. In an atmospheric pressure heated water dispensing system as claimed in claim 27 wherein said thermally actuated power element includes, a. a bellows member, and b. said bellows member charged with a refrigerant and the like material highly responsive to small variations in temperature.

34. In an atmospheric pressure heated water dispensing system as claimed in claim 27 wherein said thermally actuated power element includes, a. a housing assembly, b. phase change material in said housing assembly, c. a plug diaphragm movable responsive to expansion and contraction of said phase change material, and d. a drive shaft connected at one end to said plug diaphragm for movement therewith an operatively connected at the end remote therefrom to said slide valve means.

35. In an atmospheric pressure heated water dispensing system as claimed in claim 27 wherein said thermally actuated power element includes, a. drive shaft means extending through said transfer chamber coupled at one end to said temperature setting assembly and to the opposite end to said slide valve means, b. a plurality of bi-metallic discs stacked on the portion of said drive shaft in said transfer chamber and operatively connected to move said drive shaft by expansion and contraction of the bi-metallic stacked discs with variations in the temperature of the heated water passing through said transfer chamber.

36. In a thermally actuated modulating valve as claimed in claim 3 including, a. safety valve means on said inlet means normally maintained open to permit the free flow of cold source water therethrough when the inlet means is moved to open position, b. sensing means on said outlet means for sensing the temperature of the heated water mixture passing through said outlet means, and c. said sensing means adapted to close the safety valve means when the temperature of the heated water flowing through said outlet means exceeds a predetermined maximum temperature.

37. In a thermally actuated modulating valve as claimed in claim 3 wherein, a. said slide valve has openings therein spaced a predetermined distance from one end thereof, b. said slide valve movable to permit said openings to index more or less with at least one of said spaced outlets for varying the volume of cold source water delivered thereto, and c. said slide valve movable to prevent delivery of cold source water to the spaced outlet means of the thermally actuated modulating valve shall be rendered inoperative.

* * * * *